July 28, 1925.
M. E. BERLOWITZ
ELECTRICAL MEASURING INSTRUMENT
Filed June 27, 1917
1,547,723
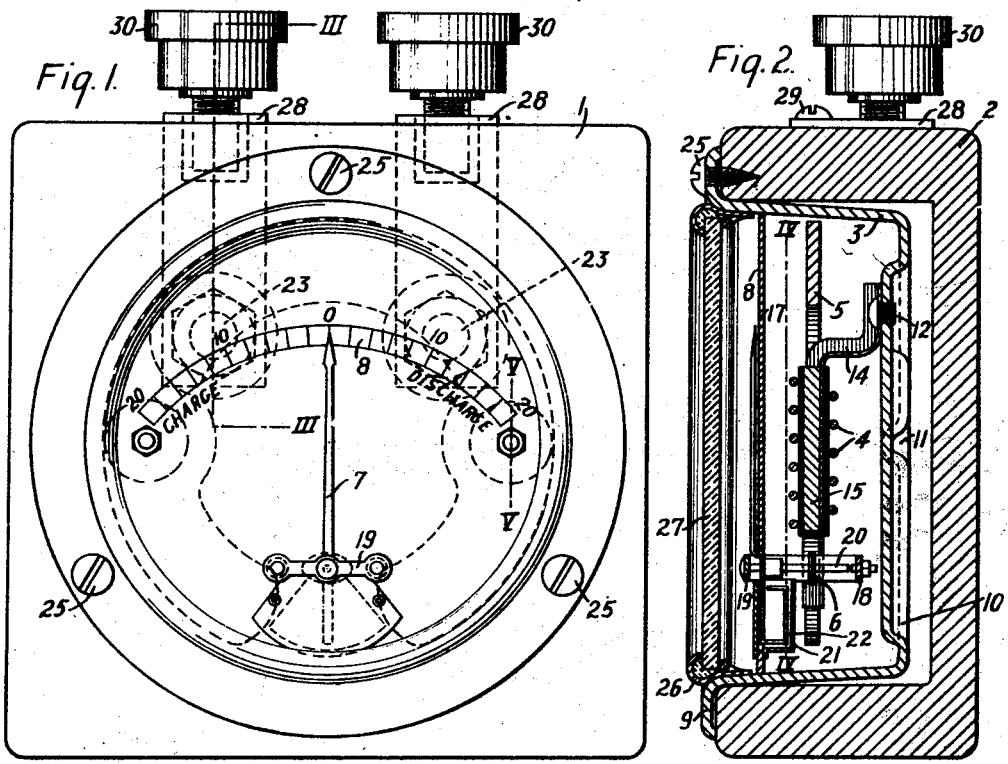
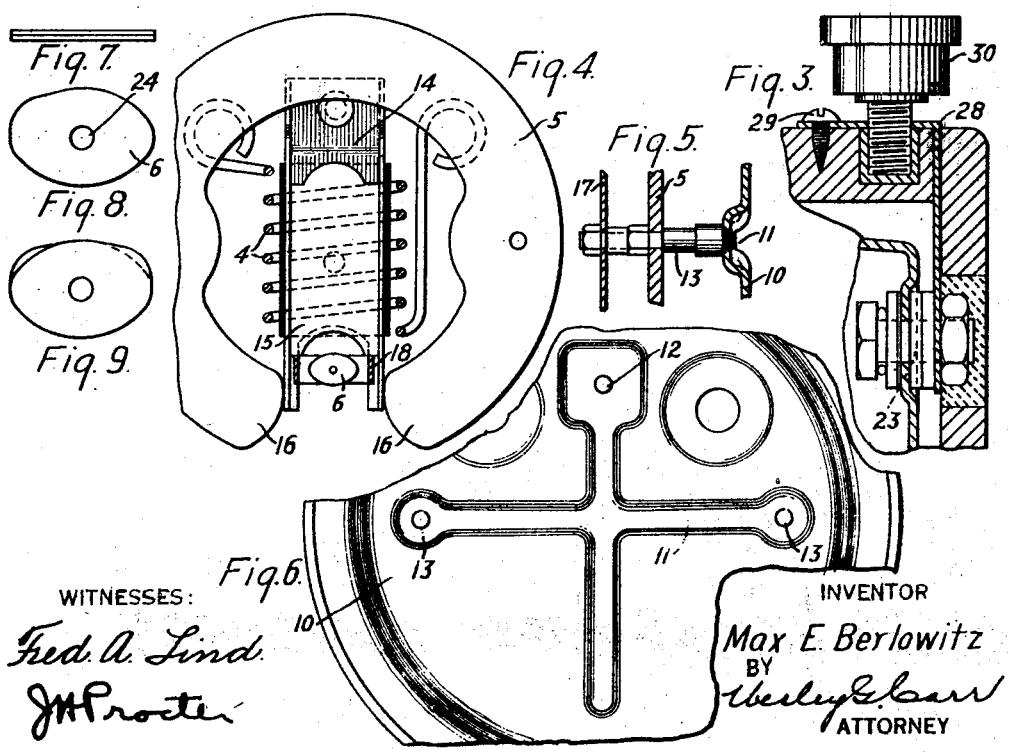
WITNESSES:
Fred. A. Lind
J. M. Procter
INVENTOR
Max E. Berlowitz
BY
Wesley G. Carr
ATTORNEY Patented July 28, 1925.

1,547,723

UNITED STATES PATENT OFFICE.

MAX E. BERLOWITZ, OF BELLEVILLE, NEW JERSEY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed June 27, 1917. Serial No. 177,191.

*To all whom it may concern:*

Be it known that I, MAX E. BERLOWITZ, a citizen of the United States, and a resident of Belleville, in the county of Essex and State of New Jersey, have invented a new and useful Improvement in Electrical Measuring Instruments, of which the following is a specification.

My invention relates to electrical measuring instruments and particularly to direct-current instruments of the moving-vane type.

One object of my invention is to provide a measuring instrument of the above indicated character that shall have a single means for supporting the winding of the instrument and its core member, for so positioning the winding that its axis shall lie directly between the poles of the controlling magnet and for positioning the movable vane with respect to the controlling magnet.

Another object of my invention is to provide a movable vane or magnetizable member for an instrument of the above indicated character that shall be mechanically and magnetically balanced.

Another object of my invention is to provide a casing for a measuring instrument that shall have its base portion so recessed as to strengthen the same and to avoid the use of protruding supporting lugs.

A further object of my invention is to provide an outer casing for an instrument of the above indicated character that shall be inexpensive to construct and attractive in appearance.

I provide a stamped metal inner cylindrical casing having a recessed base portion to which the supporting studs of the active portion of the meter are attached. A single channel member, having its channel portions spaced apart at one end, is adapted to support the winding of the meter and its core member. The spaced-apart portions of the channel member are adapted to accurately center the winding between the poles of the permanent control magnet as well as to position the movable vane. The movable vane is composed of two similar oppositely disposed magnetizable elliptical members in order that the movable system may be so mechanically and magnetically balanced that a printed two-way scale may be used. A wooden block is provided with an opening in one face thereof to receive the cylindrical inner casing and terminal members are provided on the wooden block which are operatively connected to the terminals on the base portion on the inner casing.

Figure 1 of the accompanying drawings is a front elevational view of a measuring instrument embodying my invention; Fig. 2 is a side view, partially in elevation and partially in section, of the instrument shown in Fig. 1; Fig. 3 is a sectional view taken along the line III—III of Fig. 1; Fig. 4 is a sectional view taken along the line IV—IV of Fig. 2; Fig. 5 is a sectional view taken along the line V—V of Fig. 1; Fig. 6 is a fragmentary view of the base portion of the inner casing of the instrument shown in Fig. 1, and Figs. 7, 8 and 9 are detail views of a movable magnetizable member or vane embodying a feature of my invention.

A direct-current measuring instrument 1 comprises, in general, an outer insulating casing 2, an inner cylindrical metal casing 3 in which is supported a winding 4, a permanent controlling magnet 5, a movable magnetizable member 6, a pointer 7 and a two-way scale 8.

The inner casing 3 is constructed of stamped metal and is provided with flanges 9 at its outer edge and with a base portion 10 having recesses 11 therein. The recesses 11 are adapted to strengthen the casing 3 and also to receive studs 12 and 13 which are adapted to support the active members of the instrument.

A channel member 14 is supported by the stud 12 and is adapted to support the winding 4 and its magnetizable core member 15. The outer ends of the channel member 14 are spaced apart and are adapted to so extend between poles 16 of the controlling magnet 5 that the axis of the winding 4 is accurately centered therebetween. The scale 8 is marked upon a metal plate 17 that is adapted to be secure, together with the magnet 5, to the casing 10, by the studs 13. A bracket 18 is mounted upon the rear side of the plate 17 and is adapted to co-operate with a bracket 19 that is mounted upon the front of the said plate to carry a shaft 20 upon which the movable magnetizable member 6 and the pointer 7 are mounted. A housing 21 is mounted upon the rear of the plate 17 and is adapted to receive one end 22 of the pointer 7 which constitutes a damping vane for the pointer.

The bracket 18 is so positioned by the spaced-apart portions of the channel member 14 that the member 6 is accurately centered with respect to the winding 4 and the control magnet 5. Terminal members 23 are mounted on the base portion 10 of the casing 3 and are secured to the respective terminals of the winding 4. The movable magnetizable member 6 is composed of two similar elliptical disks that are oppositely disposed with respect to each other. In order that the member 6 shall be so magnetically and mechanically balanced that a printed two-way scale may be used, it is necessary that the opening 24 shall be exactly at the center thereof. In view of the great difficulty in securing the desired magnetic and mechanical balance in a device stamped from a metal sheet, I propose to stamp two disks in one operation and then fasten them together either face-to-face or back-to-back in order to insure magnetic and mechanical balancing. In Figs. 8 and 9, the disks are shown greatly distorted to illustrate how mechanical balancing may be obtained by assembling the disks in opposite relation to each other.

The insulating outer casing 2 comprises a block of wood or other insulating material having an opening in one face thereof to receive the inner casing 3. Screws 25 may be employed to fasten the flange portion of the casing 3 to the casing 2, and a cover member, comprising a resilient ring 26 and a transparent window 27, is fitted into the outer end of the casing 3 to protect the active portions of the instrument from coming into contact with foreign bodies.

Strips of conducting material 28 are secured to the terminal members 23 and, by screws 29, to the upper portion of the casing 2. Binding posts 30 are seated in the casing 2 and in the conducting strips 28, thereby facilitating the connection of line conductors to the instrument.

The control magnet 5 is so related to the movable member 6 that, when no current transverses the winding 4, the said member assumes substantially the position shown in Figs. 1 and 4 of the drawings. However, when current transverses the winding 4, the member 6 will turn in the one or the other direction, in accordance with the direction of flow of current in the said winding, to cause the pointer 7 to indicate, on the scale 8, the value of the said current. The housing 21 and the vane 22 are provided for causing the pointer 7 to be damped in its movement to preclude it from vibration.

If it is desired to use the instrument 1 in panel boards or other similar structures, it may be removed from the casing 2 and attached to the panel board (not shown) by the screws 25, in which instance, the terminal members 23 are directly connected to the circuit the current of which is to be measured.

I do not limit my invention to the particular structures illustrated as it may be variously modified without departing from the spirit and scope of the invention as set forth in the appended claims.

I claim as my invention:

1. In an electrical measuring instrument, the combination with a stationary permanent magnet, and a winding, of a single means disposed between the poles of the magnet and in engagement therewith for supporting the winding and for so positioning the same that its axis lies directly between the poles of the permanent magnet.

2. In an electrical measuring instrument, the combination with a stationary permanent magnet, a winding and a pivotally-mounted magnetizable member, of means for supporting the pivotally mounted member, and a single means engaging the poles of the magnet for supporting the winding and so positioning the same that its axis lies directly between the poles of the stationary magnet and for positioning the supporting means for the pivotally mounted member.

3. A meter element comprising a plurality of substantially identical asymmetric members symmetrically related to constitute a balanced structure.

4. A meter element comprising a plurality of members having centers of gravity eccentric to the axis of rotation of the element and related to render the composite center of gravity thereof co-axial with the axis of rotation of the element.

5. A meter element comprising a plurality of elongated magnetizable members having pivot axes normal to the longitudinal axes thereof and angularly displaced about said pivot axes to effect predetermined balanced relation between said members.

6. In an electrical measuring instrument, the combination with a stationary permanent magnet, a pivotally mounted magnetizable member and a winding for attracting the pivotally mounted member, of a channel members having spaced-apart ends for positioning the same between the poles of the stationary magnet, and a magnetizable member disposed within the winding and supported by the channel member.

7. In an electrical measuring instrument, the combination with a stationary permanent magnet, a pivotally mounted magnetizable member and a winding for attracting the pivotally mounted member, of a member for supporting the winding having spaced-apart ends for so engaging the poles of the stationary magnet as to position the same therebetween.

8. In an electrical measuring instrument, the combination with a stationary controlling magnet of U-shape, a movable member disposed between the poles of the magnet, and an actuating winding, of means positioned between and in engagement with the poles of the magnet for so supporting the winding that its axis coincides with the center of the movable member.

In testimony whereof, I have hereunto subscribed my name this 14th day of June, 1917.

MAX E. BERLOWITZ.